United States Patent [19]
Kim

[11] Patent Number: 5,858,572
[45] Date of Patent: Jan. 12, 1999

[54] BATTERY HAVING REINFORCED STRUCTURE FOR PREVENTING EXPANSION

[75] Inventor: Kyong-jin Kim, Seoul, Rep. of Korea

[73] Assignee: Samsung Display Devices Co., Ltd., Kyungki-do, Rep. of Korea

[21] Appl. No.: 879,371

[22] Filed: Jun. 20, 1997

[30] Foreign Application Priority Data

Sep. 25, 1996 [KR] Rep. of Korea ................. 1996 42675

[51] Int. Cl.$^6$ ................................................ H01M 2/10
[52] U.S. Cl. ........................... 429/186; 429/94; 429/122; 429/164
[58] Field of Search ................................. 429/186, 122, 429/66, 164, 94

[56] References Cited

U.S. PATENT DOCUMENTS 4,939,047  7/1990  Nagashima et al. .................... 429/186
5,474,859  12/1995  Takeuchi et al. ....................... 429/186
5,756,229  5/1998  Pyszczek et al. ......................... 429/94

*Primary Examiner*—Bruce F. Bell
*Attorney, Agent, or Firm*—Lowe Hauptman Gopstein Gilman & Berner

[57] ABSTRACT

A battery having a reinforced structure capable of preventing expansion of the bottom of the battery case due to internal pressure generated during charging of a secondary battery is provided. A conventional battery has a problem that in order to achieve higher performance and smaller size, the thickness of the battery case is decreased, and therefore the bottom of the battery case is expanded outward due to increases in the internal pressure caused by gas generated during charging. To solve the above problem, a lower reinforcement plate having a number of protrusions is placed in the battery case and welded to the bottom of the battery case. Accordingly, the lower reinforcement plate prevents expansion of the battery, and performance of the battery can be enhanced.

2 Claims, 2 Drawing Sheets

BATTERY HAVING REINFORCED STRUCTURE FOR PREVENTING EXPANSION

BACKGROUND OF THE INVENTION

The present invention relates to a battery, and more particularly to a battery having a reinforced structure for preventing the case of a secondary battery from expanding due to an increase of internal pressure.

In a conventional secondary battery which is repeatedly charged and discharged, the internal pressure is increased due to gas generated during charging. When the internal pressure of the battery is increased to the critical pressure or higher, the lower end of the battery case is expanded outward.

FIG. 1 is a partial sectional view of a conventional battery having the lower end expanded due to the internal pressure. In the battery case, positive and negative plates are alternately arranged with a separator interposed therebetween. Typically, such a separator is wound between the positive and negative plates in the battery case.

As shown in FIG. 1, the lower insulation ring of the battery and the lower end of the battery case are expanded and transformed due to the internal pressure. This is because the internal pressure of the secondary battery is increased by gas generated during charging. In the case of a nickel-cadmium battery, oxygen gas generated during charging is absorbed, as expressed by the formula: $2Cd+O_2+2H_2O \rightarrow 2Cd(OH)_2$. However, the rate of absorption of the oxygen ($O_2$) is different from the rate of generation of the oxygen ($O_2$), which causes the internal pressure. In other words, as soon as the oxygen is generated, it is impossible to instantly perform the reaction of absorbing the oxygen, although the internal pressure is increased due to generation of oxygen, the absorption speed is increased.

As the battery is made smaller in size, lighter in weight, and higher in performance, the active materials in the battery comprise a large fraction of the total battery volume and the thickness of the battery case must be decreased. However, as the battery case becomes thinner, the lower end of the battery case more severely expands outward, which is an important consideration limiting the design of high-performance battery structures.

The expansion of the lower end of the battery should be considered in fabricating a package cell battery as well as a unit cell battery.

In a cylindrical battery case of one body type, the battery case can be manufactured to have a thick bottom and thin sides. Here, treatment stress increasingly generated during manufacturing increases the strength of the material. However, crack or bursting due to the internal pressure may occur when heat treatment for removing the stress is not performed. In the case of performing the heat treatment for removing stress after a process of shaping, the lower end of the battery case which is a little thickly made of the same material as that of the battery case may be also transformed due to the internal pressure. This is because the material is selected with reference to treatment of the battery case.

SUMMARY OF THE INVENTION

It is an object of the present invention to provide a battery having a reinforced structure capable of preventing expansion of the battery case due to the internal pressure.

To accomplish the above object of the present invention, there is provided a battery having a reinforced structure capable of preventing expansion comprising a battery case, negative and positive plates alternately arranged, separators interposed therebetween and upper and lower insulation rings, wherein a lower reinforcement plate with a number of protrusions designed to increase mechanical strength is inserted in said battery case and welded to the bottom of said battery case.

Accordingly, the thickness of the lower end of the battery case is increased, so that the lower end is not expanded by the high internal pressure generated during charging.

BRIEF DESCRIPTION THE DRAWINGS

The above object and advantages of the present invention will become more apparent by describing in detail a preferred embodiment thereof with reference to the attached drawings in which.

DETAILED DESCRIPTION OF THE INVENTION

Figure 1:
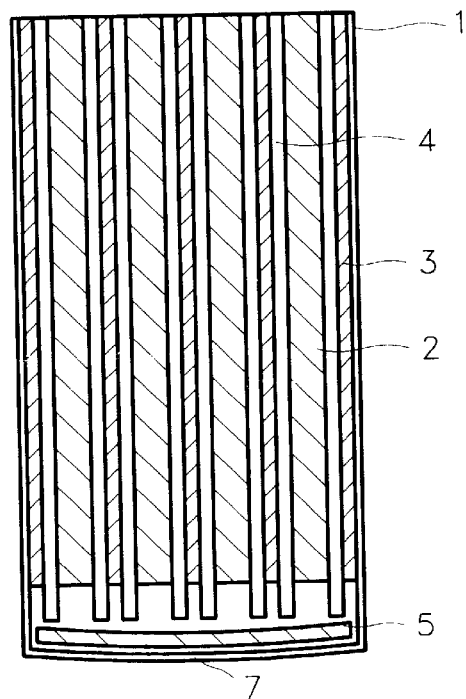
FIG. 1 is a partial sectional view of a conventional battery having a lower end portion expanded due to internal pressure.
Figure 2:
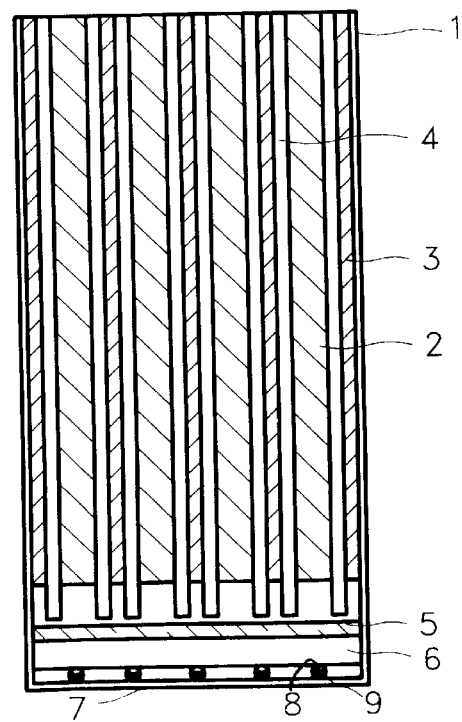
FIG. 2 is a partial sectional view of a battery using a lower reinforcement plate according to the present invention.

For conveniency, the same elements between FIGS. 1 and 2 are assigned by the same reference numerals.

Referring to FIG. 2, a battery case 1 includes positive plates 2 coated with positive active material and negative plates 3 coated with negative active material which are alternately arranged, and separators 4 interposed between the positive plates 2 and the negative plates 3. Also, an insulation ring 5 for insulating the plates 2 and 3 from the battery case 1 is positioned in the lower portion of the battery case 1. Welds 9 are formed between protrusions 8 of the lower reinforcement plate 6, located below the insulating ring 5, and the bottom 7 of the battery case.

Figure 3A:
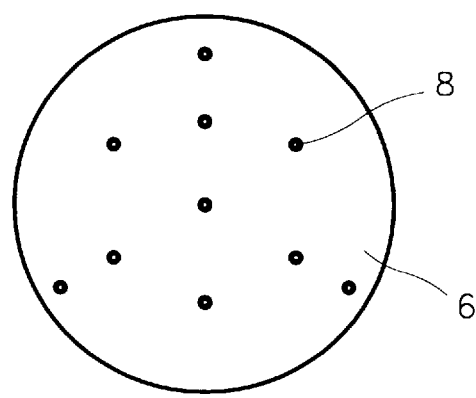
FIG. 3A is a bottom view of a lower reinforcement plate according to an embodiment of the present invention.
Figure 3B:
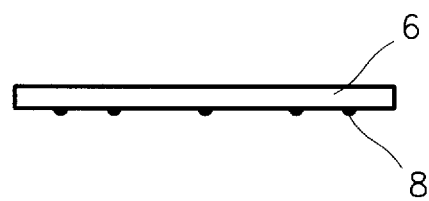
FIG. 3B is a side view of FIG. 3A.

As shown in FIGS. 3A and 3B, protrusions 8, uniformly arranged, are located on the bottom of the lower reinforcement plate 6. The number of the protrusions 8 can be increased or reduced as necessary. The protrusion 8 is a welded place between the lower reinforcement plate 6 and the case bottom 7. When the number of the welds are increased, the bottom 7 of the battery case becomes weaker and the working amount increases. Accordingly, it is preferred that the number of the protrusions, which is determined by materials of the lower reinforcement plate 6 and the battery case 1 and their weldability, is sufficient to maintain the physical attachment between the lower reinforcement plate 6 and the bottom 7 when the internal pressure increases in the battery case 1.

Figure 4:
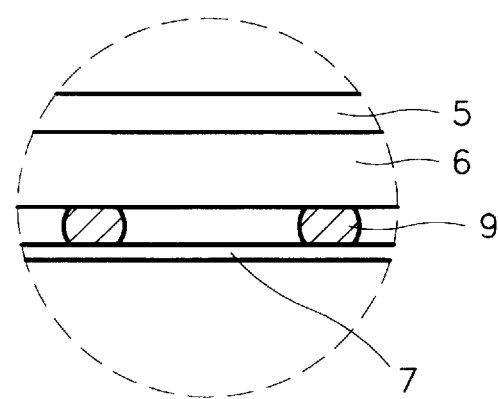
FIG. 4 is a partial enlarged view of a section of the lower end of a battery case having a welded lower reinforcement plate according to the present invention.

Referring to FIG. 4, the lower reinforcement plate 6 is located between the lower insulating ring 5 and the bottom 7 and welded to the bottom 7 by weld 9. The total height of the lower reinforcement plate 6 and the weld 9 which are shown in detail in FIG. 4 is 0.3 mm or less.

Welding between the protrusion 8 of the lower reinforcement plate 6 and the bottom 7 will be described as follows. The material may be weak due to a poor weld or failure to perform heat treatment after the welding. This is because the welding forms stresses in the welds and in the material around the welds. When the welded portion is oxidized due to the high temperatures generated during welding, the oxidized portion is very weak and so welding in an inert atmosphere is preferred.

It is preferable to weld the lower reinforcement plate 6 by an electron beam method or a laser beam method having a high heat concentration. Also, an electric resistance welding method can be alternatively used. When the electron beam welding is performed, for example, only the protrusions 8 are melted and welded, thereby protecting the mechanical properties of the lower reinforcement plate 6. In order to melt only the protrusions 8, the quantity of heat used for the welding should be accurately controlled. For example, in the case of the electric resistance welding, the current should be controlled.

As described above, when the lower reinforcement plate is used, the structure of a bottom of the battery case is reinforced sufficiently to endure internal pressures occurring during charging of the secondary battery. Accordingly, a portion forming a battery case can be thinned, to thereby enhance capacity.

What is claimed is:

1. A battery having a reinforced structure capable of preventing expansion comprising a battery case, negative and positive plates alternately arranged, separators interposed therebetween and upper and lower insulation rings, wherein a lower reinforcement plate with a number of protrusions designed to increase mechanical strength is inserted in said battery case and welded to the bottom of said battery case.

2. A battery having a reinforced structure capable of preventing expansion comprising a battery case, negative and positive plates alternately arranged, separators interposed therebetween and upper and lower insulation rings, wherein a lower reinforcement plate with a number of protrusions designed to increase mechanical strength is inserted in said battery case and welded by one of electron beam, laser beam and electric resistance welding methods, to the bottom of said battery case in an inert atmosphere.

\* \* \* \* \*